US005734679A

United States Patent [19]

Nomura

[11] Patent Number: 5,734,679

[45] Date of Patent: Mar. 31, 1998

[54] VOICE SIGNAL TRANSMISSION SYSTEM USING SPECTRAL PARAMETER AND VOICE PARAMETER ENCODING APPARATUS AND DECODING APPARATUS USED FOR THE VOICE SIGNAL TRANSMISSION SYSTEM

[75] Inventor: Toshiyuki Nomura, Tokyo, Japan

[73] Assignee: NEC Corporation, Japan

[21] Appl. No.: 584,950

[22] Filed: Jan. 16, 1996

[30] Foreign Application Priority Data

Jan. 17, 1995 [JP] Japan .................................... 7-005090

[51] Int. Cl.[6] ...................................................... H04B 14/06

[52] U.S. Cl. ......................... 375/245; 375/240; 395/2.31; 395/2.39

[58] Field of Search ..................................... 375/240, 243, 375/245; 395/2.31, 2.39, 2.3, 2.32, 2.14, 2.18, 2.28, 2.29

[56] References Cited

U.S. PATENT DOCUMENTS 5,271,089 12/1993 Ozawa .................................. 395/2.31

5,487,128 1/1996 Ozawa .................................. 395/2.31

OTHER PUBLICATIONS

Furui, S., "Digital Voice Processing", Tokai University Press Association, pp. 89–94 (with translation), Version 1, Sep. 25, 1985.

Gersho, A. and Gray, R.M., "Vector Quantization and Signal Compression", Kluwer Academic Publishers, 1991, pp. 309–316.

*Primary Examiner*—Temesghen Ghebretinsae

*Attorney, Agent, or Firm*—Ostrolenk, Faber, Gerb & Soffen, LLP

[57] ABSTRACT

The invention provides a voice signal transmission system which reduces the amount of increase in calculation while suppressing possible deterioration of the performance by an expansion in the distribution of a voice parameter representative of an envelope of a voisce pectrum when input voice having a plurality of frequency characteristics is treated simultaneously. Discrimination circuit 5 discriminates, based on a voice parameter extracted by spectrum parameter extraction circuit 2, another voice parameter obtained by quantization of the extracted voice parameter by first quantization circuit 3 and a further voice parameter obtained by quantization of the extracted audio parameter by second quantization circuit 4, which one of either third quantization circuit 6 designed corresponding to first quantization circuit 3 or fourth quantization circuit 7 designed corresponding to second quantization circuit 4 should be used. Then, in accordance with a result of the discrimination, third quantization circuit 6 or fourth quantization circuit 7 quantizes a quantization error of corresponding first quantization circuit 3 or second quantization circuit 4 as an error vector. On the reception side, the error vector is dequantized in accordance with the discrimination.

5 Claims, 3 Drawing Sheets

VOICE SIGNAL TRANSMISSION SYSTEM USING SPECTRAL PARAMETER AND VOICE PARAMETER ENCODING APPARATUS AND DECODING APPARATUS USED FOR THE VOICE SIGNAL TRANSMISSION SYSTEM

BACKGROUND OF THE INVENTION

1. Field of the Invention

This invention relates to a voice signal transmission system which encodes a voice signal using a vector quantization circuit, transmits the coded audio signal and decodes the coded voice signal effectively at the receiver side.

2. Description of Related Art

Vector quantization is known as an effective method of transmitting and storing voice data. Vector quantization is a method for selecting the code the vector whose distance from an input vector is the shortest from a code book having a plurality of code vectors designed in advance. By transmitting and storing the selected code (number) representative of the code vector, a voice input signal can be transmitted and stored effectively. Details of the vector quantization and multistage vector quantization are disclosed, in A. Gersho et al., "Vector Quantization and Signal Compression", Kluwer Academic Publishers.

When a voice parameter encoding apparatus is realized using the vector quantization described above, and if input voice having a plurality of frequency characteristics is treated by the same encoding apparatus, the distribution of a voice parameter which represents an envelope of a voice spectrum will expand, resulting in deterioration of the performance of the voice parameter encoding apparatus. As a countermeasure against the deterioration of the performance, a method wherein the number of quantization bits of an audio parameter which represents an envelope of a voice spectrum is increased and another method wherein a quantization circuit is prepared for each frequency characteristic to detect an available optimum quantization value are adaptable.

Operation of a voice signal transmission system which encodes a voice parameter using the latter method is described below with reference to FIG. 1. For simplified description, it is assumed that the input voice data has two different frequency characteristics and a quantization circuit is designed for each of the characteristics respectively. Here, it is assumed that the two frequency characteristics of input voice are frequency characteristic (hereinafter referred to as FLAT characteristic) in which the voice band is limited to a normal voice band and another frequency characteristic (hereinafter referred to as IRS characteristic) which is emphasized in the high frequency region.

The spectrum parameter extraction circuit 32 calculates a parameter representative of a spectrum envelope of input voice data inputted through input terminal 31 for a frame after every fixed interval of time, and outputs the parameter as an input vector to first quantization circuit 33 and second quantization circuit 34. As the parameter representative of a spectrum envelope, a known parameter called line spectrum pair (LSP) is available. A method of analyzing a line spectrum pair is disclosed in Furui, "Digital voice Processing", the Publishing Society of Tokai University.

The first quantization circuit 33 is designed for the FLAT characteristic while second quantization circuit 34 is designed for the IRS characteristic. The first quantization circuit 33 quantizes the input vector using the vector quantization described above and outputs the quantization vector to discrimination circuit 35. Further, first quantization circuit 33 outputs a code corresponding to the quantization vector to discrimination circuit 35.

Similarly, second quantization circuit 34 quantizes the input vector using the vector quantization described above and outputs the quantization vector to discrimination circuit 35. Further, second quantization circuit 34 outputs a code corresponding to the quantization vector to discrimination circuit 35.

The discrimination circuit 35 discriminates the characteristic of an input vector, either the FLAT characteristic or the IRS characteristic, based on the quantization vectors of first quantization circuit 33, second quantization circuit 34 and the input vector. Then, discrimination circuit 35 outputs a code of the input voice corresponding to the frequency characteristic and discrimination information representative of a result of the discrimination through transmission circuit 36.

In the decoding apparatus, reception circuit 37 receives the code and the discrimination information transmitted thereto from transmission circuit 36 and is selectively connected to first dequantization circuit 38 or second dequantization circuit 39 in response to the discrimination information so that the selectively connected dequantization circuit may perform dequantization of the code to produce a dequantization vector corresponding to the code. The dequantization code is outputted from output terminal 40.

However, since all of the prior art apparatus described above require comparison processing with a large number of code vectors, the amount of required calculation is very great. Further, even if multistage vector quantization which involves a reduced amount of calculation is used, real time processing is still difficult.

SUMMARY OF THE INVENTION

It is an object of the present invention to provide a voice signal transmission system which reduces the quantity of calculation by suppressing possible deterioration of performance due to expansion in the distribution of a voice parameter representative of an envelope of a voice spectrum when input voice data having a plurality of frequency characteristics is treated simultaneously and a voice parameter encoding apparatus and decoding apparatus for use with the voice signal transmission system.

In order to attain the object described above, according to an aspect of the present invention, there is provided a voice parameter encoding apparatus, comprising a spectral parameter extraction circuit for calculating a voice parameter representative of a spectrum envelope of a voice input signal for each frame of every predetermined fixed interval of time, a first quantization circuit for quantizing the voice parameter outputted from the spectrum parameter extraction circuit as a parameter having a first frequency characteristic and outputting a first quantization vector and for outputting a first code representative of the first quantization vector, a second quantization circuit for quantizing the voice parameter outputted from the spectrum parameter extraction circuit as a parameter having a second frequency characteristic and outputting a second quantization vector and for outputting a second code representative of the second quantization vector, a discrimination circuit for receiving the first and second quantization vectors and the voice parameter outputted from the spectrum parameter extraction circuit, discriminating and selecting the one of either the first or second quantization vectors which is nearer to the audio parameter outputted from the spectrum parameter extraction circuit, calculating a difference between the selected first or second quantization vector and the voice parameter outputted from the spectrum parameter extraction circuit as an error vector, outputting a first code or a second code representative of the selected first or second quantization vector together with discrimination information, and outputting, when the first quantization vector is selected, the calculated error vector to a first route, but outputting, when the second quantization vector is selected, the calculated error vector to a second route, a third quantization circuit for quantizing, when the error vector is outputted from the discrimination circuit to the first route, the outputted error vector and outputting a third code corresponding to the quantization vector obtained by the quantization, a fourth quantization circuit for quantizing the outputted error vector when the error vector is outputted from the discrimination circuit to the second route, and outputting a fourth code corresponding to the quantization, vector obtained by the quantization, and a transmission circuit for receiving the first or second code outputted from the discrimination circuit, the discrimination information, and the third or fourth code outputted from the third or fourth quantization circuit as inputs thereto and outputting the inputs to a transmission line.

Preferably, the discrimination circuit refers, upon selection of the one of either the first or second quantization vectors which is nearer to the audio parameter outputted from the spectrum parameter extraction circuit, a weight as a result of discrimination performed in the past.

According to another aspect of the present invention, there is provided a voice parameter decoding apparatus for decoding a transmission signal from a voice parameter encoding apparatus which includes a spectral parameter extraction circuit for calculating a voice parameter representative of a spectrum envelope of a voice input signal for each frame of every predetermined fixed interval of time, a first quantization circuit for quantizing the voice parameter outputted from the spectrum parameter extraction circuit as a parameter having a first frequency characteristic and outputting a first quantization vector and for outputting a first code representative of the first quantization vector, a second quantization circuit for quantizing the voice parameter outputted from the spectrum parameter extraction circuit as a parameter having a second frequency characteristic and outputting a second quantization vector and for outputting a second code representative of the second quantization vector, a discrimination circuit for receiving the first and second quantization vectors and the audio parameter outputted from the spectrum parameter extraction circuit, discriminating and selecting the one of either the first or second quantization vectors which is nearer to the voice parameter outputted from the spectrum parameter extraction circuit, calculating a difference between the selected first or second quantization vector and the voice parameter outputted from the spectrum parameter extraction circuit as an error vector, outputting a first code or a second code representative of the selected first or second quantization vector together with discrimination information, and outputting, when the first quantization vector is selected, the calculated error vector to a first route, but outputting, when the second quantization vector is selected, the calculated error vector to a second route, a third quantization circuit for quantizing the outputted error vector when the error vector is outputted from the discrimination circuit to the first route, and outputting a third code corresponding to the quantization vector obtained by the quantization, a fourth quantization circuit for quantizing, when the error vector is outputted from the discrimination circuit to the second route, the outputted error vector and outputting a fourth code corresponding to the quantization vector obtained by the quantization, and a transmission circuit for receiving the first or second code outputted from the discrimination circuit, the discrimination information, and the third or fourth code outputted from the third or fourth quantization circuit as inputs thereto and outputting the inputs to a transmission line, the voice parameter decoding apparatus comprising a reception circuit for receiving the transmission signal, discriminating from the discrimination information of the transmission signal whether the discrimination signal is originated from the first or third quantization circuit or from the second or fourth quantization circuit and outputting, when a result of the discrimination shows that the transmission signal originates from the first or third quantization circuit, the transmission signal to a third route, but outputting, when the result of the discrimination shows that the transmission signal originates from the second or fourth quantization circuit, the transmission signal to a fourth route, a first dequantization circuit for dequantizing the first code and a third dequantization circuit for dequantizing the third code as well as a first adder circuit for adding outputs of the first and third dequantization circuits and outputting a result of the addition to an output terminal when the transmission signal is outputted to the third route, and a second dequantization circuit for dequantizing the second code and a fourth dequantization circuit for dequantizing the fourth code as well as a second adder circuit for adding outputs of the second and fourth dequantization circuits and outputting a result of the addition to the output terminal when the transmission signal is outputted to the fourth route.

According to a further aspect of the present invention, there is provided a voice signal transmission system, comprising the voice parameter encoding apparatus described above, the voice parameter decoding apparatus described above, and a transmission line for interconnecting between the transmission circuit of the audio parameter encoding apparatus and the reception circuit of the voice parameter decoding apparatus.

DESCRIPTION OF THE PREFERRED EMBODIMENTS

Figure 1:
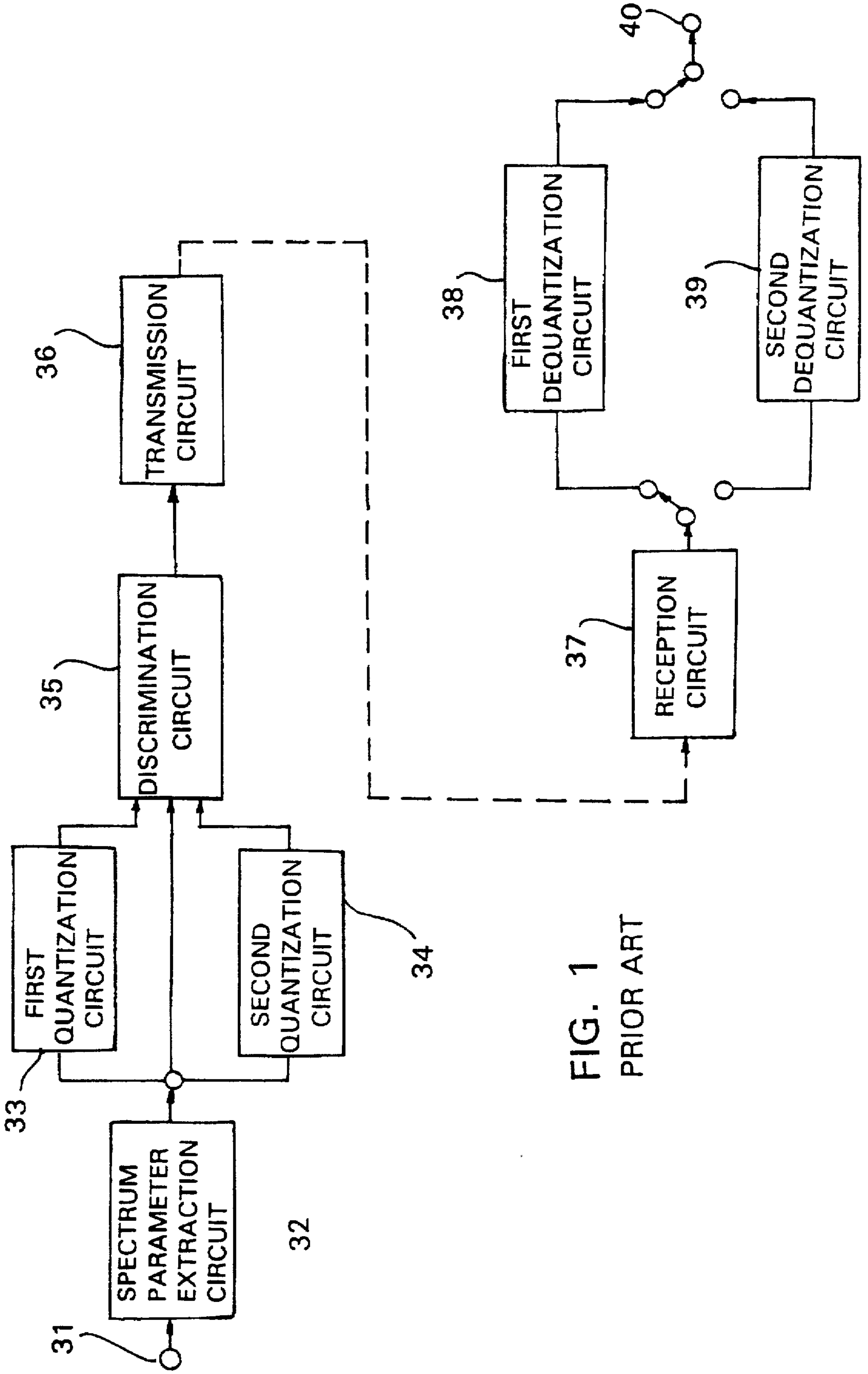
FIG. 1 PRIOR ART
FIG. 1 is a block diagram showing a system construction of an example of a conventional audio signal transmission system.
Figure 2:
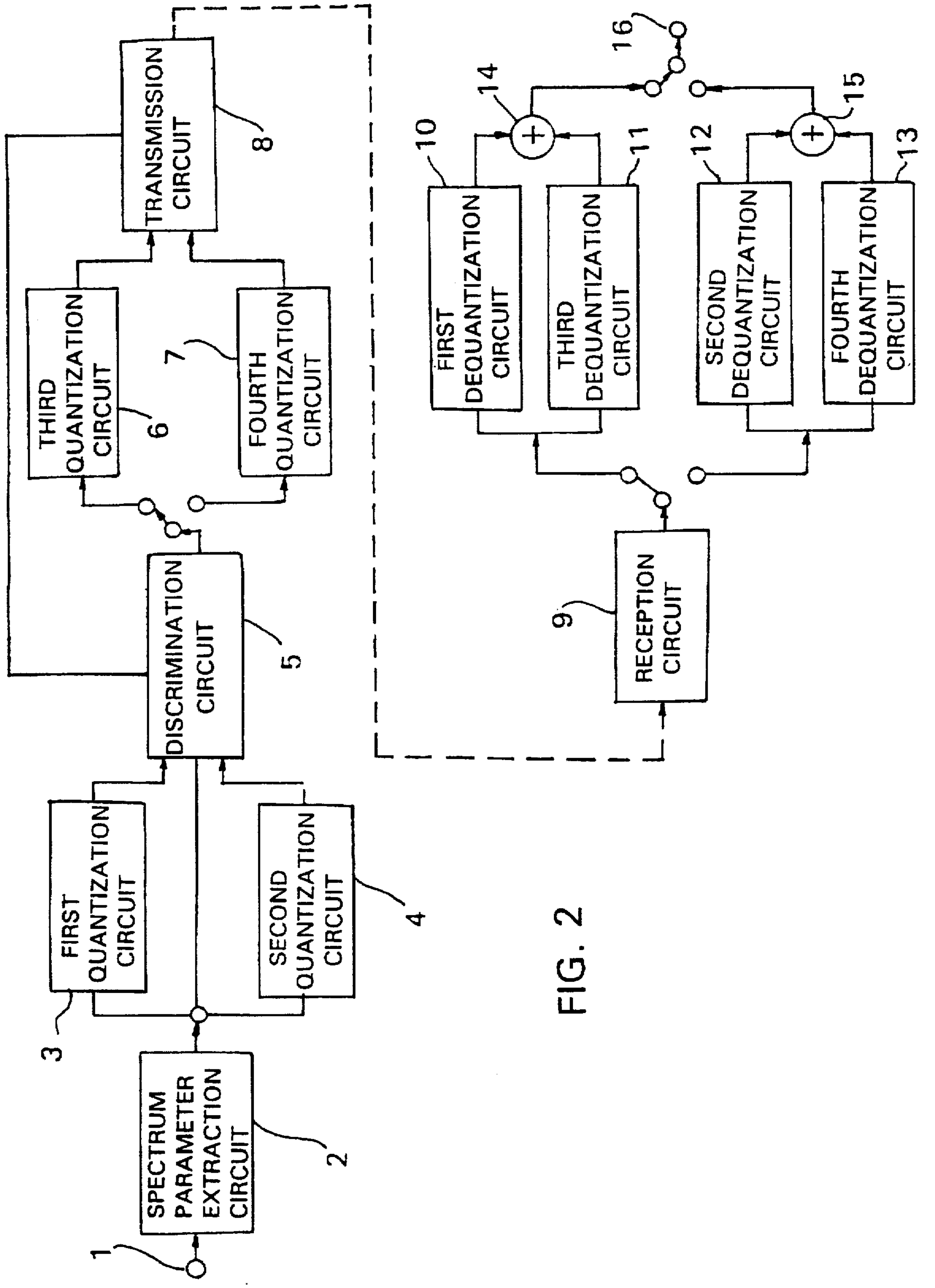
FIG. 2 is a block diagram showing a system construction of a first embodiment of the voice signal transmission system of the present invention.

Embodiments of the present invention are described below with reference to the drawings. FIG. 2 is a block diagram showing a system construction of a first embodiment of the voice signal transmission system of the present invention. In the present embodiment, for practical and simplified description, it is assumed that input voice has two different frequency characteristics. Here, it is assumed that the two frequency characteristics of the input voice are a frequency characteristic (hereinafter referred to as FLAT characteristic) in which the voice band is limited normaly and another frequency characteristic (hereinafter referred to as IRS characteristic) in which the voice is emphasized in a high frequency region.

The spectrum parameter extraction circuit 2 calculates a parameter representative of a spectrum envelope of input voice inputted though input terminal 1 for a frame after every fixed number of frames, and outputs the calculated parameter as an input vector to first quantization circuit 3, second quantization circuit 4 and discrimination circuit 5. As the parameter representative of a spectrum envelope, a known parameter called line spectrum pair is used. Naturally, the parameter representative of a spectrum envelope is not limited to the line spectrum pair.

The first quantization circuit 3 is designed for the FLAT characteristic described above. The first quantization circuit 3 quantizes the input vector from spectrum parameter extraction circuit 2 and outputs a quantization vector obtained as a result of the vector quantization to discrimination circuit 5. Further, first quantization circuit 3 outputs a code corresponding to the quantization vector to discrimination circuit 5.

The second quantization circuit 4 is designed for the IRS characteristic described above. The second quantization circuit 4 quantizes the input vector from spectrum parameter extraction circuit 2 and outputs the quantization vector obtained as a result of the vector quantization to discrimination circuit 5. Further, second quantization circuit 4 outputs a code corresponding to the quantization vector to discrimination circuit 5.

The discrimination circuit 5 discriminates to which frequency characteristic of the FLAT characteristic or the IRS characteristic an input voice belongs, based on the quantization vector of first quantization circuit 3, the quantization vector of second quantization circuit 4 and the input vector. Then, discrimination circuit 5 subtracts the quantization vector of the discriminated characteristic from the input vector to calculate an error vector. When the discrimination result is the FLAT characteristic, discrimination circuit 5 outputs the calculated error vector to third quantization circuit 6 and outputs the code corresponding to the quantization vector which was based on the calculation of the error vector and discrimination information representative of the discrimination result to transmission circuit 8. When the discrimination result is the IRS characteristic, discrimination circuit 5 outputs the calculated error vector to fourth quantization circuit 7 and outputs the code corresponding to the quantization vector which was based on the calculation of the error vector and discrimination information representative of the discrimination result to transmission circuit 8.

The third quantization circuit 6 is designed for the FLAT characteristic so that it may quantize the error vector of first quantization circuit 3. The third quantization circuit 6 quantizes the inputted error vector based on the discrimination result outputted from discrimination circuit 5, and outputs a code corresponding to the quantized error vector to transmission circuit 8.

The fourth quantization circuit 7 is designed for the IRS characteristic in order to quantize the error vector of second quantization circuit 4. The fourth quantization circuit 7 quantizes the inputted error vector based on the discrimination result outputted from discrimination circuit 5 and outputs a code corresponding to the quantized error vector to transmission circuit 8.

The transmission circuit 8 transmits the code and the discrimination information representative of the discrimination result inputted from discrimination circuit 5 as well as a code obtained from third quantization circuit 6 or fourth quantization circuit 7 to a decoding apparatus.

The reception circuit 9 in the decoding apparatus receives the code and the discrimination information transmitted from transmission circuit 8. When the received discrimination information represents the FLAT characteristic, reception circuit 9 outputs the received code to first dequantization circuit 10 and third dequantization circuit 11. When the received discrimination information represents the IRS characteristic, reception circuit 9 outputs the received code to second dequantization circuit 12 and fourth dequantization circuit 13.

The first dequantization circuit 10 performs dequantization corresponding to the quantization of first quantization circuit 3, and third dequantization circuit 11 performs dequantization corresponding to the quantization of third quantization circuit 6. Meanwhile, second dequantization circuit 12 performs dequantization corresponding to the quantization of second quantization circuit 4, and fourth dequantization circuit 13 performs dequantization corresponding to the quantization of fourth quantization circuit 7.

The first addition circuit 14 adds the quantization vector from first dequantization circuit 10 and the quantization vector from third dequantization circuit 11 and outputs a result of the addition to output terminal 16. The second addition circuit 15 adds the quantization vector from second dequantization circuit 12 and the quantization vector from fourth dequantization circuit 13 and outputs a result of the addition to output terminal 16.

While the embodiment described above is applied to the case wherein input voice has two different frequency characteristics, a method of increasing the number P, the number of frequency characteristics, can be analogized readily. Further, when the number P, the number of frequency characteristics, is increased, the number K (K<P), the number of potential frequency characteristics, shall be quantized by discrimination circuit 5 to determine a corresponding frequency characteristic and a corresponding code based on a final result of the quantization.

Figure 3:
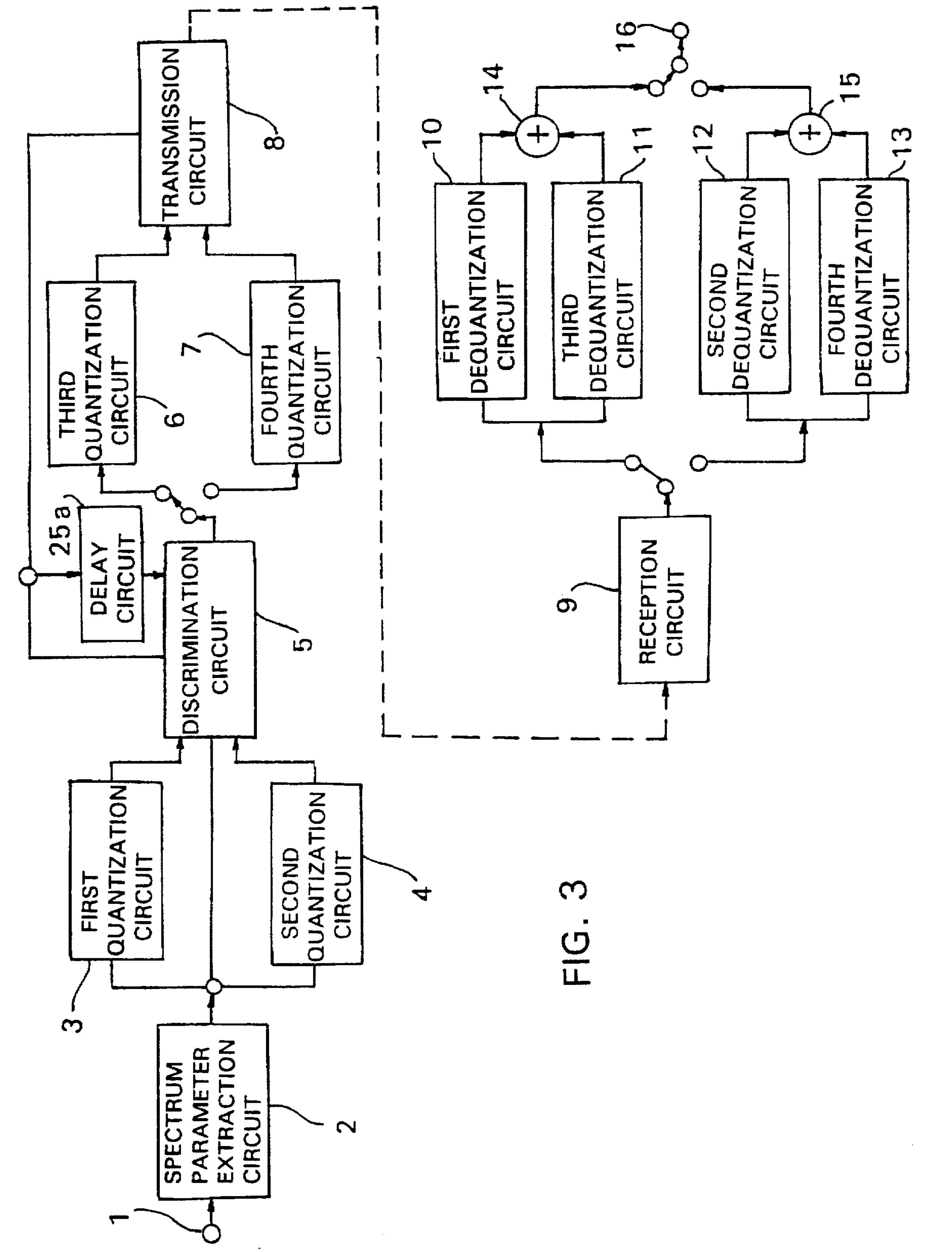
FIG. 3 is a block diagram showing a system construction of a second embodiment of the voice signal transmission system of the present invention.

The second embodiment of the present invention is described below with reference to FIG. 3. The frequency characteristic of the input voice data does not vary with data unit of frame for which processing is performed, but relies upon the entire input voice data to the audio parameter encoding apparatus. Therefore, when the discrimination circuit discriminates to which one of either the FLAT characteristic or the IRS characteristic an inputted voice belongs, the deterioration of the performance of the voice parameter encoder caused by an error in discrimination can be further reduced by discriminating the present frames on the basis of weighting the results of their past discrimination respectively. For simplified description of the second embodiment, operation of discrimination circuit 5 using a result or results of discrimination in the past is described herein after. The operations of the other components are the same as those of the first embodiment shown in FIG. 2.

The discrimination circuit 25 discriminates to which one of either the FLAT characteristic or the IRS characteristic the inputted voice data belongs, based on a result or results of past discrimination obtained from delay circuit 25*a*, a quantization vector of first quantization circuit 3, another quantization vector of second quantization circuit 4 and an input vector. Then, discrimination circuit 25 subtracts the quantization vector of the discriminated characteristic from the input vector to obtain an error vector and outputs the error vector to third quantization circuit 6 or fourth quantization circuit 7 in response to the result of discrimination. Further, discrimination circuit 25 outputs a corresponding code and discrimination information representative of the result of discrimination to transmission circuit 8.

As a method for weighting an evaluated value at present with a result or results of past discrimination, for example, the following method may be used. For the evaluated value, a square of distance between the quantization vectors obtained from the first and second quantization circuits and the input vector is used.

(1) The weighting coefficient to a quantization vector for the frequency characteristic which has the same result of past discrimination is set as a predetermined value W ($W<1$, for example, 0.8), and the weighting coefficient to a quantization vector for the other frequency characteristic having no discrimination result is set as 1.0.

(2) When the same result of discrimination successively occurs, weighting coefficient W(x) is varied with the number (x) of the successive frames. For example, weighting coefficients W(x) are set to $W(0)=1.0$, $W(1)=0.9$, $W(2)=0.8, \ldots,$ and $W(5)=0.5$. In the present example, when the repetition number x of the same discrimination result is greater than 5, x is set to $x=5$. By discriminating the frequency characteristic of the input voice using a result of past discrimination in accordance with the method described above, the discrimination value can be stabilized in successive frames.

As described above, according to the present invention, since it is discriminated to which frequency characteristics an input vector belongs and limits the operation of quantization circuit only for the quantization circuits which are provided for the discriminated frequency characteristic, the amount of calculation can be reduced, and deterioration-in performance can be prevented.

What is claimed is:

1. A voice parameter encoding apparatus, comprising:

a spectral parameter extraction circuit for calculating a voice parameter representative of a spectrum envelope of a voice input signal for each frame of every predetermined fixed interval of time;

a first quantization circuit for quantizing the voice parameter outputted from said spectrum parameter extraction circuit as a parameter having a first frequency characteristic and outputting a first quantization vector and for outputting a first code representative of the first quantization vector;

a second quantization circuit for quantizing the voice parameter outputted from said spectrum parameter extraction circuit as a parameter having a second frequency characteristic and outputting a second quantization vector and for outputting a second code representative of the second quantization vector;

a discrimination circuit for receiving the first and second quantization vectors and the voice parameter outputted from said spectrum parameter extraction circuit, discriminating and selecting the one of either the first or second quantization vectors which is nearer to the voice parameter outputted from said spectrum parameter extraction circuit, calculating a difference between the selected first or second quantization vector and the voice parameter outputted from said spectrum parameter extraction circuit as an error vector, outputting a first code or a second code representative of the selected first or second quantization vector together with discrimination information, and outputting, when the first quantization vector is selected, the calculated error vector to a first route, but outputting, when the second quantization vector is selected, the calculated error vector to a second route;

a third quantization circuit for quantizing, when the error vector is outputted from said discrimination circuit to said first route, the outputted error vector and outputting a third code corresponding to the quantization vector obtained by the quantization;

a fourth quantization circuit for quantizing the outputted error vector when the error vector is outputted from said discrimination circuit to said second route, and outputting a fourth code corresponding to the quantization vector obtained by the quantization; and a transmission circuit for receiving the first or second code outputted from said discrimination circuit, the discrimination information, and the third or fourth code outputted from said third or fourth quantization circuit as inputs thereto and outputting the inputs to a transmission line.

2. A voice parameter encoding apparatus as claimed in claim 1, wherein said discrimination circuit refers, upon selection of the one of either the first or second quantization vectors which is nearer to the voice parameter outputted from said spectrum parameter extraction circuit, a weight as a result of discrimination performed in the past.

3. A voice parameter decoding apparatus for decoding a transmission signal from a voice parameter encoding apparatus which includes a spectral parameter extraction circuit for calculating a voice parameter representative of a spectrum envelope of a voice input signal for each frame of every predetermined fixed interval of time, a first quantization circuit for quantizing the voice parameter outputted from said spectrum parameter extraction circuit as a parameter having a first frequency characteristic and outputting a first quantization vector and for outputting a first code representative of the first quantization vector, a second quantization circuit for quantizing the voice parameter outputted from said spectrum parameter extraction circuit as a parameter having a second frequency characteristic and outputting a second quantization vector and for outputting a second code representative of the second quantization vector, a discrimination circuit for receiving the first and second quantization vectors and the voice parameter outputted from said spectrum parameter extraction circuit, discriminating and selecting the one of either the first or second quantization vectors which is nearer to the voice parameter outputted from said spectrum parameter extraction circuit, calculating a difference between the selected first or second quantization vector and the voice parameter outputted from said spectrum parameter extraction circuit as an error vector, outputting a first code or a second code representative of the selected first or second quantization vector together with discrimination information, and outputting, when the first quantization vector is selected, the calculated error vector to a first route, but outputting, when the second quantization vector is selected, the calculated error vector to a second route, a third quantization circuit for quantizing, when the error vector is outputted from said discrimination circuit to said first route, the outputted error vector and outputting a third code corresponding to the quantization vector obtained by the quantization, a fourth quantization circuit for quantizing the outputted error vector when the error vector is outputted from said discrimination circuit to said second route, and outputting a fourth code corresponding to the quantization vector obtained by the quantization, and a transmission circuit for receiving the first or second code outputted from said discrimination circuit, the discrimination information, and the third or fourth code outputted from said third or fourth quantization circuit as inputs thereto and outputting the inputs to a transmission line as a transmission signal, said voice parameter decoding apparatus comprising:

a reception circuit for receiving the transmission signal, discriminating from the discrimination information of the transmission signal whether a discrimination signal is originated from one of either said first or third quantization circuit or from one of either said second or fourth quantization circuit and outputting, when a result of the discrimination shows that the transmission signal originates from said first or third quantization circuit, the transmission signal to a third route, but outputting, when the result of the discrimination shows that the transmission signal originates from the second or fourth quantization circuit, the transmission signal to a fourth route;

a first dequantization circuit for dequantizing the first code;

a third dequantization circuit for dequantizing the third code;

a first adder circuit for adding outputs of said first and third dequantization circuits and outputting a result of the addition to an output terminal when the transmission signal is outputted to said third route; and a second dequantization circuit for dequantizing the second code;

a fourth dequantization circuit for dequantizing the fourth code;

a second adder circuit for adding outputs of said second and fourth dequantization circuits and outputting a result of the addition to said output terminal when the transmission signal is outputted to said fourth route.

4. A voice signal transmission system, comprising a voice parameter encoding apparatus as claimed in claim 1, a voice parameter decoding apparatus as claimed in claim 3, and a transmission line for interconnecting between a transmission circuit of said voice parameter encoding apparatus as claimed in claim 1 and a reception circuit of said voice parameter decoding apparatus as claimed in claim 3.

5. A voice signal transmission system, comprising a voice parameter encoding apparatus as claimed in claim 2, a voice parameter decoding apparatus as claimed in claim 3, and a transmission line for interconnecting between a transmission circuit of said voice parameter encoding apparatus as claimed in claim 2 and a reception circuit of said voice parameter decoding apparatus as claimed in claim 3.

* * * * *